(12) United States Patent
Tang

(10) Patent No.: US 10,440,724 B2
(45) Date of Patent: Oct. 8, 2019

(54) METHOD FOR TRANSMITTING SRS, NETWORK DEVICE AND TERMINAL DEVICE

(71) Applicant: GUANGDONG OPPO MOBILE TELECOMMUNICATIONS CORP., LTD., Dongguan, Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/362,054

(22) Filed: Mar. 22, 2019

(65) Prior Publication Data

US 2019/0223188 A1    Jul. 18, 2019

Related U.S. Application Data

(63) Continuation of application No. PCT/CN2016/099943, filed on Sep. 23, 2016.

(51) Int. Cl.
| | | |
|---|---|---|
| *H04W 72/08* | (2009.01) | |
| *H04W 72/04* | (2009.01) | |
| *H04L 5/00* | (2006.01) | |

(52) U.S. Cl.
CPC .......... *H04W 72/085* (2013.01); *H04L 5/005* (2013.01); *H04L 5/0037* (2013.01); *H04W 72/048* (2013.01); *H04W 72/0453* (2013.01)

(58) Field of Classification Search
None
See application file for complete search history.

(56) References Cited

U.S. PATENT DOCUMENTS

| 8,797,988 B2 | 8/2014 | Natarajan |
|---|---|---|
| 9,225,447 B2 | 12/2015 | Chen |
| (Continued) | | |

FOREIGN PATENT DOCUMENTS

| CN | 101795145 A | 8/2010 |
|---|---|---|
| CN | 102404074 A | 4/2012 |
| (Continued) | | |

OTHER PUBLICATIONS

International Search Report in international application No. PCT/CN2016/099943, dated Jun. 16, 2017.

(Continued)

*Primary Examiner* — Ajit Patel

(57) ABSTRACT

Disclosed in the present invention are a method for transmitting a sounding reference signal (SRS), a network device and a terminal device. The method comprises: a network device determining multiple symbols used for transmitting an SRS in a first uplink subframe; the network device transmitting first indication information to each of multiple terminal devices, the first indication information being used for indicating a symbol of the multiple symbols corresponding to said each terminal device, a first terminal device of the multiple terminal devices corresponding to a first symbol of the multiple symbols, the first symbol being used for transmitting the SRS of the first terminal device. Thus, during the transmission between the network device and the terminal device using uplink-downlink channel reciprocity, influences caused by channel characteristic aging can be reduced.

14 Claims, 10 Drawing Sheets

(56) References Cited

U.S. PATENT DOCUMENTS

| | | | |
|---|---|---|---|
| 2011/0058505 A1* | 3/2011 | Pan | H04J 11/005 370/280 |
| 2012/0127932 A1* | 5/2012 | Gao | H04L 5/0035 370/329 |
| 2012/0147774 A1 | 6/2012 | Park | |
| 2013/0028138 A1 | 1/2013 | Hao | |
| 2013/0182618 A1 | 7/2013 | Chen | |
| 2013/0188623 A1* | 7/2013 | Chen | H04L 1/0028 370/336 |
| 2013/0229989 A1* | 9/2013 | Natarajan | H04W 72/042 370/329 |
| 2015/0009845 A1* | 1/2015 | Takano | H04W 52/0206 370/252 |
| 2015/0181589 A1* | 6/2015 | Luo | H04B 7/0452 370/329 |
| 2015/0256308 A1* | 9/2015 | Ma | H04L 5/0035 370/330 |
| 2015/0358960 A1* | 12/2015 | Zhang | H04W 72/0426 455/450 |
| 2016/0056942 A1* | 2/2016 | Wang | H04L 5/0048 |
| 2016/0100407 A1* | 4/2016 | Gaal | H04W 72/0453 370/329 |
| 2016/0254892 A1* | 9/2016 | Kim | H04W 52/34 370/280 |
| 2016/0352551 A1* | 12/2016 | Zhang | H04L 27/2602 |
| 2017/0013618 A1* | 1/2017 | Shin | H04W 72/0446 |
| 2017/0347322 A1* | 11/2017 | Lee | H04L 5/0007 |
| 2018/0343090 A1* | 11/2018 | Yan | H04L 5/001 |
| 2019/0044670 A1* | 2/2019 | Li | H04W 76/11 |

FOREIGN PATENT DOCUMENTS

| | | |
|---|---|---|
| CN | 102577173 A | 7/2012 |
| EP | 2469736 A2 | 6/2012 |
| EP | 2542004 A1 | 1/2013 |
| KR | 20160062731 A | 6/2016 |
| WO | 2011054256 A1 | 5/2011 |
| WO | 2012155507 A1 | 11/2012 |
| WO | 2014101170 A1 | 7/2017 |

OTHER PUBLICATIONS

Written Opinion of the International Search Authority in international application No. PCT/CN2016/099943, dated Jun. 16, 2017.
"Frame structure for Channel Reciprocity Based Downling MIMO in NR", issued on Aug. 2016.
Supplementary European Search Report in the European application No. 16916553.7, dated Jul. 12, 2019.

* cited by examiner

METHOD FOR TRANSMITTING SRS, NETWORK DEVICE AND TERMINAL DEVICE

CROSS-REFERENCE TO RELATED APPLICATIONS

This is a continuation application of International Patent Application No. PCT/CN2016/099943, filed on Sep. 23, 2016, and entitled "METHOD FOR TRANSMITTING SRS, NETWORK DEVICE AND TERMINAL DEVICE", the entire contents of which are incorporated herein by reference.

TECHNICAL FIELD

Embodiments of the disclosure relate to the field of wireless communication, and more particularly to a method for transmitting a channel sounding reference signal (SRS), a network device and a terminal device.

BACKGROUND

Multiple Input Multiple Output (MIMO) is a core technology for 4th Generation (4G) communication and 5th Generation (5G) communication. In a Long Term Evolution (LTE)/LTE-Advanced (LTE-A) system, codebook-feedback-based closed loop MIMO becomes the mainstream and is fully developed. However, in a 5G massive MIMO system, an uplink/downlink channel reciprocity-based non-codebook closed loop MIMO technology will be applied more widely. That is, Channel State Information (CSI) is acquired in advance by uplink channel estimation for downlink precoding/beamforming transmission.

Closed loop MIMO transmission by use of uplink/downlink channel reciprocity in a 5G communication system is also confronted with many technical challenges. Two main challenges are the channel aging problem and the problem of limits to the number of uplink reference signals, for example, channel SRSs. Since a channel aging effect of a 4G system is not so serious, latencies among an SRS, codebook feedback and signal transmission of an LTE system may not exceed a coherence time of a channel even though they are relatively long. Therefore, the LTE system is not specially optimized to shorten a latency from channel measurement to data transmission. For either a periodic SRS or an aperiodic SRS, the SRS is configured on a last symbol of each uplink subframe only.

However, in the 5G system, a channel aging effect may be greatly intensified and a coherence time may also be greatly shortened.

SUMMARY

Embodiments of the disclosure provide a method for transmitting an SRS, a network device and a terminal device, which can reduce influence brought by channel aging in an uplink/downlink channel reciprocity-based transmission process.

A first aspect provides a method for transmitting a channel SRS, which is characterized by including the following operations.

A network device determines multiple symbols for transmitting SRSs in a first uplink subframe.

The network device transmits first indication information to each of multiple terminal devices, the first indication information indicating the symbol corresponding to each terminal device in the multiple symbols, a first terminal device in the multiple terminal devices corresponding to a first symbol in the multiple symbols and the first symbol being used to transmit an SRS of the first terminal device.

Since the symbols for transmitting the SRSs of the multiple terminal devices are all located in the first uplink subframe, influence brought by channel aging may be reduced in an uplink/downlink channel reciprocity-based transmission process of the network device and the terminal devices.

Alternatively, the number of subframes between the first uplink subframe and a first downlink subframe after the first uplink subframe may be less than or equal to a predetermined number.

Alternatively, a next subframe of the first uplink subframe may be a downlink subframe.

Alternatively, a length of the first symbol for transmitting the SRS of the first terminal device may be unequal to a length of a second symbol for transmitting downlink data of the first terminal device.

Alternatively, the method may further include that: the network device determines a frequency-domain resource for transmitting the SRS of the first terminal device, the first indication information transmitted to the first terminal device by the network device further indicating the frequency-domain resource for transmitting the SRS of the first terminal device.

Alternatively, a frequency-domain range configured for transmission of the downlink data of the first terminal device may be the same as a frequency-domain range configured for transmission of the SRS of the first terminal device.

Alternatively, the method may further include that: the network device receives second indication information indicating a channel aging speed of the first terminal device from the first terminal device.

Alternatively, the method may further include that: the network device determines the second symbol for transmitting the downlink data of the first terminal device according to the channel aging speed, the first indication information transmitted to the first terminal device by the network device further indicating the second symbol for transmitting the downlink data of the first terminal device.

Alternatively, the multiple symbols may further include a symbol for transmitting an SRS of a second terminal device, the channel aging speed of the first terminal device may be higher than a channel aging speed of the second terminal device, the first symbol for transmitting the SRS of the first terminal device may be located after the symbol for transmitting the SRS of the second terminal device, and the second symbol for transmitting the downlink data of the first terminal device may be located before a symbol for transmitting downlink data of the second terminal device.

Alternatively, the second indication information may include a magnitude of the channel aging speed of the first terminal device or a speed level corresponding to the channel aging speed of the first terminal device.

A second aspect provides a network device, which may be configured to execute each process executed by the network device in the SRS transmission method in the first aspect and each implementation. The network device includes a determination module and a transmitting module. The determination module is configured to determine multiple symbols for transmitting SRSs in a first uplink subframe. The transmitting module is configured to transmit first indication information to each of multiple terminal devices, the first indication information indicating the symbol corresponding to each terminal device in the multiple symbols determined by the determination module, a first terminal device in the multiple terminal devices corresponding to a first symbol in the multiple symbols and the first symbol being used to transmit an SRS of the first terminal device.

A third aspect provides a network device, which may be configured to execute each process executed by the network device in the SRS transmission method in the first aspect and each implementation. The network device includes a processor and a transceiver. The processor is configured to determine multiple symbols for transmitting SRSs in a first uplink subframe. The transceiver is configured to transmit first indication information to each of multiple terminal devices, the first indication information indicating the symbol corresponding to each terminal device in the multiple symbols determined by a determination module, a first terminal device in the multiple terminal devices corresponding to a first symbol in the multiple symbols and the first symbol being used to transmit an SRS of the first terminal device.

A fourth aspect provides a method for transmitting a channel SRS, which is characterized by including the following operations.

A first terminal device receives first indication information from a network device, the first indication information indicating a first symbol for transmitting an SRS of the first terminal device in a first uplink subframe, the first uplink subframe including multiple symbols for transmitting SRSs of multiple terminal devices, the multiple terminal devices including the first terminal device and the multiple symbols including the first symbol.

The first terminal device transmits the SRS of the first terminal device to the network device on the first symbol.

Since the symbols for transmitting the SRSs of the multiple terminal devices are all located in the first uplink subframe, influence brought by channel aging may be reduced in an uplink/downlink channel reciprocity-based transmission process of the network device and the terminal devices.

Alternatively, the number of subframes between the first uplink subframe and a first downlink subframe after the first uplink subframe may be less than or equal to a predetermined number.

Alternatively, a next subframe of the first uplink subframe may be a downlink subframe.

Alternatively, a length of the first symbol for transmitting the SRS of the first terminal device may be unequal to a length of a second symbol for transmitting downlink data of the first terminal device.

Alternatively, the first indication information received from the network device by the first terminal device may further indicate a frequency-domain resource for transmitting the SRS of the first terminal device.

Alternatively, a frequency-domain range configured for transmission of the downlink data of the first terminal device may be the same as a frequency-domain range configured for transmission of the SRS of the first terminal device.

Alternatively, the method may further include that: the first terminal device transmits second indication information indicating a channel aging speed of the first terminal device to the network device, the first indication information received from the network device by the first terminal device further indicating a position of the second symbol for transmitting the downlink data of the first terminal device.

Alternatively, the multiple symbols may further include a symbol for transmitting an SRS of a second terminal device, the channel aging speed of the first terminal device may be higher than a channel aging speed of the second terminal device, the first symbol for transmitting the SRS of the first terminal device may be located after the symbol for transmitting the SRS of the second terminal device, and the second symbol for transmitting the downlink data of the first terminal device may be located before a symbol for transmitting downlink data of the second terminal device.

Alternatively, the second indication information may include a magnitude of the channel aging speed of the first terminal device or a speed level corresponding to the channel aging speed of the first terminal device.

A fifth aspect provides a terminal device, which may be configured to execute each process executed by the terminal device in the SRS transmission method in the fourth aspect and each implementation. The terminal device includes a receiving module and a transmitting module. The receiving module is configured to receive first indication information from a network device, the first indication information indicating a first symbol for transmitting an SRS of the first terminal device in a first uplink subframe, the first uplink subframe including multiple symbols for transmitting SRSs of multiple terminal devices, the multiple terminal devices including the first terminal device and the multiple symbols including the first symbol. The transmitting module is configured to transmit the SRS of the first terminal device to the network device on the first symbol received by the receiving module.

A sixth aspect provides a terminal device, which may be configured to execute each process executed by the terminal device in the SRS transmission method in the fourth aspect and each implementation. The terminal device includes a processor and a transceiver. The transceiver is configured to receive first indication information from a network device, the first indication information indicating a first symbol for transmitting an SRS of the first terminal device in a first uplink subframe, the first uplink subframe including multiple symbols for transmitting SRSs of multiple terminal devices, the multiple terminal devices including the first terminal device and the multiple symbols including the first symbol, and transmit the SRS of the first terminal device to the network device on the first symbol received by a receiving module.

A seventh aspect provides a method for transmitting a channel SRS, which is characterized by including the following operation.

A network device receives indication information indicating a channel aging speed of a first terminal device from the first terminal device.

Alternatively, the network device may determine a first symbol for transmitting an SRS of the first terminal device and a second symbol for transmitting downlink data of the first terminal device according to the channel aging speed.

The network device may acquire the channel aging speed of the first terminal device according to second indication information, so that a system transmission resource may be reasonably configured according to the channel aging speed to implement scheduling over the terminal device and the like.

Alternatively, the channel aging speed of the first terminal device may be higher than a channel aging speed of a second terminal device, the first symbol for transmitting the SRS of the first terminal device may be located after a symbol for transmitting an SRS of the second terminal device, and the second symbol for transmitting the downlink data of the first terminal device may be located before a symbol for transmitting downlink data of the second terminal device.

Since the network device may configure a resource for transmitting the SRS and a resource for transmitting the downlink data for the terminal device according to the channel aging speed of the terminal device, the resources may be reasonably utilized and influence brought by channel aging may be reduced in an uplink/downlink channel reciprocity-based transmission process of the network device and the terminal device.

Alternatively, the indication information may include a magnitude of the channel aging speed of the first terminal device or a speed level corresponding to the channel aging speed of the first terminal device.

An eighth aspect provides a network device, which may be configured to execute each process executed by the network device in the SRS transmission method in the seventh aspect and each implementation. The network device includes a receiving module. The receiving module is configured to receive indication information indicating a channel aging speed of a first terminal device from the first terminal device.

A ninth aspect provides a network device, which may be configured to execute each process executed by the network device in the SRS transmission method in the seventh aspect and each implementation. The network device includes a processor and a transceiver. The transceiver is configured to receive indication information indicating a channel aging speed of a first terminal device from the first terminal device.

A tenth aspect provides a method for transmitting a channel SRS, which is characterized by including that: a first terminal device transmits indication information indicating a channel aging speed of the first terminal device to a network device.

The first terminal device transmits its own channel aging speed to the network device to enable the network device to acquire the channel aging speed of the first terminal device according to second indication information, so that a system transmission resource may be reasonably configured according to the channel aging speed to implement scheduling over the terminal device and the like.

Alternatively, the channel aging speed of the first terminal device may be higher than a channel aging speed of a second terminal device, a first symbol for transmitting an SRS of the first terminal device may be located after a symbol for transmitting an SRS of the second terminal device, and a second symbol for transmitting downlink data of the first terminal device may be located before a symbol for transmitting downlink data of the second terminal device.

Since the terminal device transmits its own channel aging speed to the network device to enable the network device to configure a resource for transmitting the SRS and a resource for transmitting the downlink data for the terminal device, the resources may be reasonably utilized and influence brought by channel aging may be reduced in an uplink/downlink channel reciprocity-based transmission process of the network device and the terminal device.

Alternatively, the indication information may include a magnitude of the channel aging speed of the first terminal device or a speed level corresponding to the channel aging speed of the first terminal device.

An eleventh aspect provides a terminal device, which may be configured to execute each process executed by the terminal device in the SRS transmission method in the tenth aspect and each implementation. The terminal device includes a transmitting module. The transmitting module is configured to transmit indication information indicating a channel aging speed of a first terminal device to a network device.

A twelfth aspect provides a terminal device, which may be configured to execute each process executed by the terminal device in the SRS transmission method in the tenth aspect and each implementation. The terminal device includes a processor and a transceiver. The transceiver is configured to transmit indication information indicating a channel aging speed of a first terminal device to a network device.

A thirteenth aspect provides a computer-readable storage medium, which stores a program, the program enabling a network device to execute any data transmission method in the first aspect and each implementation thereof.

A fourteenth aspect provides a computer-readable storage medium, which stores a program, the program enabling a terminal device to execute any data transmission method in the fourth aspect and each implementation thereof.

A fifteenth aspect provides a computer-readable storage medium, which stores a program, the program enabling a network device to execute any data transmission method in the seventh aspect and each implementation thereof.

A sixteenth aspect provides a computer-readable storage medium, which stores a program, the program enabling a network device to execute ally data transmission method in the tenth aspect and each implementation thereof.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a present communication system of a Global System of Mobile Communication (GSM), a Code Division Multiple Access (CDMA) system, a Wideband Code Division Multiple Access (WCDMA) system, a General Packet Radio Service (GPRS), an LTE system, a Universal Mobile Telecommunication System (UMTS) and the like, and are particularly applied to a future 5G system.

In the embodiments of the disclosure, a terminal device may also be User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (GRAN) scenario. Or the network device may be a relay station, an access point, a vehicle-mounted device, a wearable device, a network device in the future 5G communication network, a network device in the future evolved PLMN or the like.

Figure 1:
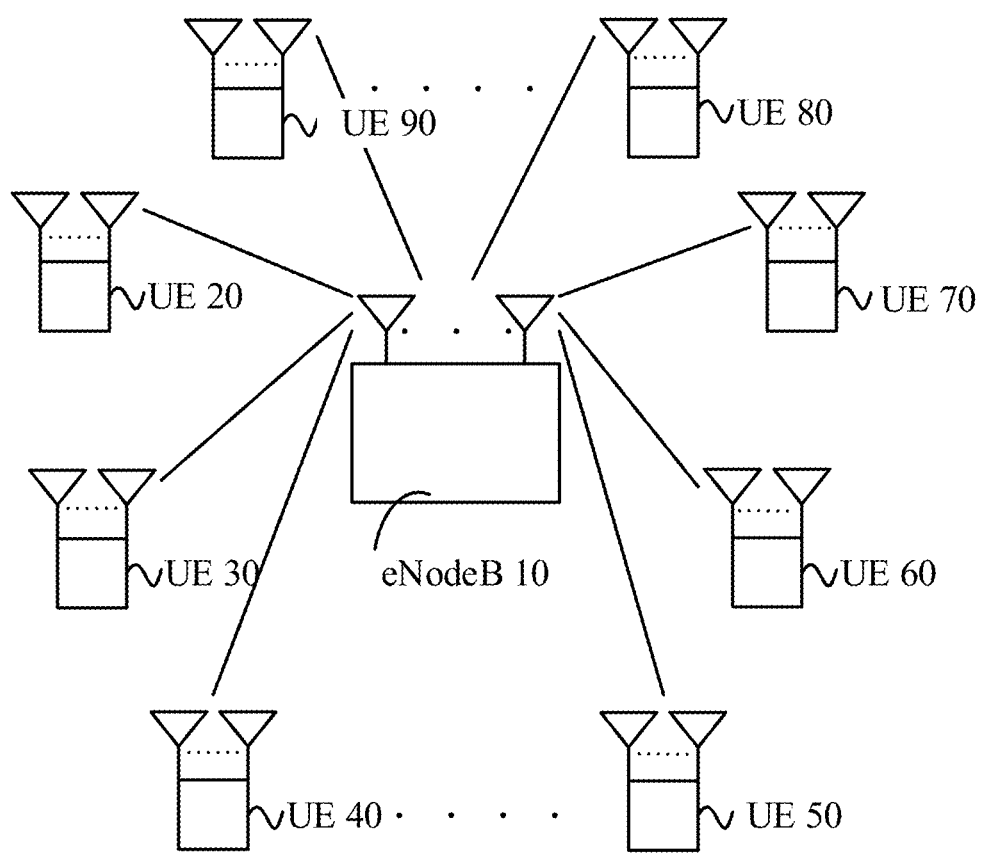
FIG. 1 illustrates a schematic architecture diagram of an application scenario according to an embodiment of the disclosure.
Figure 3:
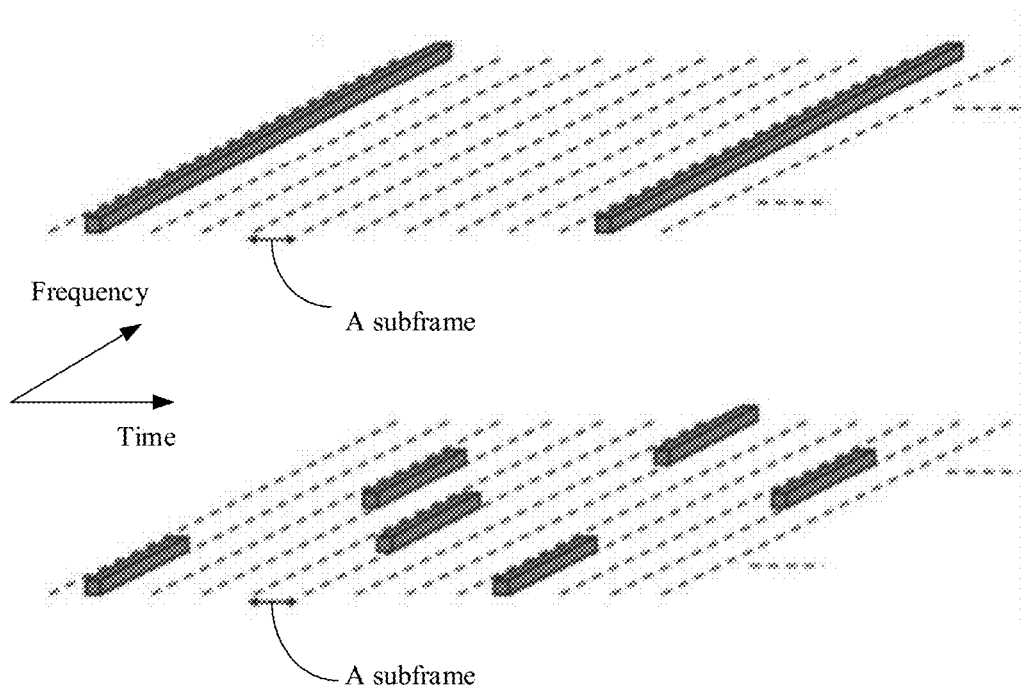
FIG. 3 illustrates a schematic diagram of SRS transmission in the prior art.

FIG. 1 illustrates a schematic architecture diagram of an application scenario according to an embodiment of the disclosure. A basic network architecture of a communication system illustrated in FIG. 1 may include a network device, for example, an eNodeB 10, and at least one terminal device, for example, UE 20, UE 30, UE 40, UE 50, UE 60, UE 70, UE 80 and UE 90. Each of the UEs 20 to 90 and the eNodeB 10 may include at least one antenna. As illustrated in FIG. 3, the eNodeB 10 is configured to provide a communication service for at least one of the UEs 20 90 for access to a core network. The UEs 20 to 90 search for a synchronization signal, broadcast signal and the like transmitted by the eNodeB 10 to access the network, thereby communicating with the network. For example, at least one of the UEs 20 to 90 may perform data transmission with the eNodeB 10 on the basis of an uplink/downlink channel reciprocity-based non-codebook closed loop MIMO technology. That is, the eNodeB 10 acquires CSI in advance by uplink channel estimation, and uses the CSI for downlink precoding or beamforming transmission.

The network in the embodiments of the disclosure may refer to a PLMN or a Device to Device (D2D) network or a Machine to Machine/Man (M2M) network or another network. FIG. 1 only illustrates an example of an application scenario according to the embodiments of the disclosure. The embodiments of the disclosure may also be applied to other scenarios. In addition, FIG. 1 is only an exemplary simplified schematic diagram. The network may further include another network device which is not presented in FIG. 1.

The solutions disclosed in the disclosure may be applied to an uplink/downlink channel reciprocity-based non-codebook closed loop MIMO scenario. Compared with codebook-feedback-based closed loop MIMO transmission, non-codebook closed loop MIMO transmission may obtain CSI more accurate than that obtained by a codebook feedback method and supports narrow beamforming of massive MIMO and Multi-User MIMO (MU-MIMO) involving massive terminals. Moreover, a huge uplink signaling overhead brought by massive downlink CSI-Reference Signals (CSI-RSs) and codebook feedback in massive MIMO may be avoided. A huge uplink overhead caused by MU-MIMO involving massive terminals for, for example, SRSs may further be avoided.

However, there exist many technical problems for uplink/downlink channel reciprocity-based closed loop MIMO transmission in a 5G system, for example, the channel aging problem and the problem of limits to the number of SRSs.

Feasibility of closed loop MIMO depends on coherence of a channel. That is, there may be made a hypothesis that the channel does not age obviously in a coherence time of the channel and a channel measurement result obtained at a previous moment may be adopted for precoding/beamforming at a next moment. However, if a delay from acquisition of CSI to data transmission exceeds the coherence time of the channel, the channel aging problem may be brought.

Figure 2:
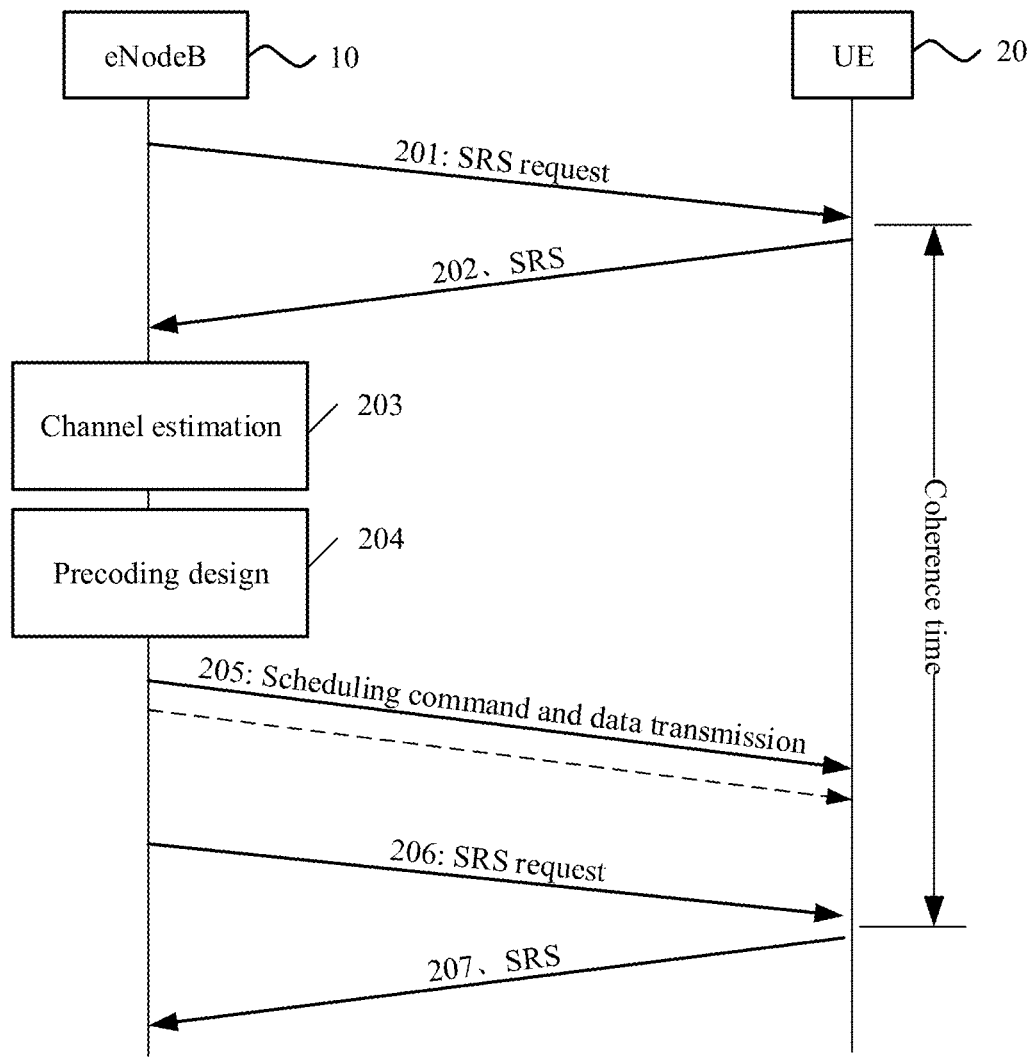
FIG. 2 illustrates a schematic diagram about channel aging and a coherence time in the prior art.

FIG. 2 illustrates a schematic diagram about channel aging and a coherence time. For example, for the eNodeB 10 and UE 20 in FIG. 1 and for an SRS, an uplink/downlink channel reciprocity-based non-codebook closed loop MIMO transmission process includes the following operations.

In 201, the eNodeB 10 transmits an SRS request to the UE 20.

In 202, the UE 20 receives the SRS request from the eNodeB 10 in 201 and transmits an SRS to the eNodeB 10.

In 203, the eNodeB 10 performs channel estimation according to the received SRS to acquire CSI.

In 204, the eNodeB 10 performs precoding design for downlink transmission according to the CSI.

In 205, the eNodeB 10 transmits a scheduling command and/or data to the UE 20.

In 206, the eNodeB 10 transmits a next SRS request to the UE 20.

In 207, the UE 20 receives the SRS request from the eNodeB 10 in 206 and transmits an SRS for the SRS request to the eNodeB 10.

A time length between two adjacent moments when the UE 20 transmits the SRSs to the eNodeB 10 may called a coherence time. If a delay of CSI acquisition of the eNodeB 10 in 203 exceeds the coherence time of a channel, the channel aging (or called channel aging) problem may be brought.

Since a channel aging effect of a 4G system is not so serious, delays among an SRS, codebook feedback and signal transmission of an LTE system may not exceed a coherence time of a channel even though they are relatively long. Therefore, the LTE system is not specially optimized to shorten a delay from channel measurement to data transmission. For either a periodic SRS or an aperiodic SRS, the SRS is configured on a last symbol of each uplink subframe only. FIG. 3 illustrates a schematic diagram of uplink data transmission in the prior art. Only one symbol on each uplink subframe of a 4G system is adopted to transmit an SRS. FIG. 3 illustrates SRS transmission conditions of two conditions of a non-frequency hopping mode and a frequency hopping mode. Under the two conditions, a last symbol of each uplink subframe is used to transmit an SRS.

Figure 4:
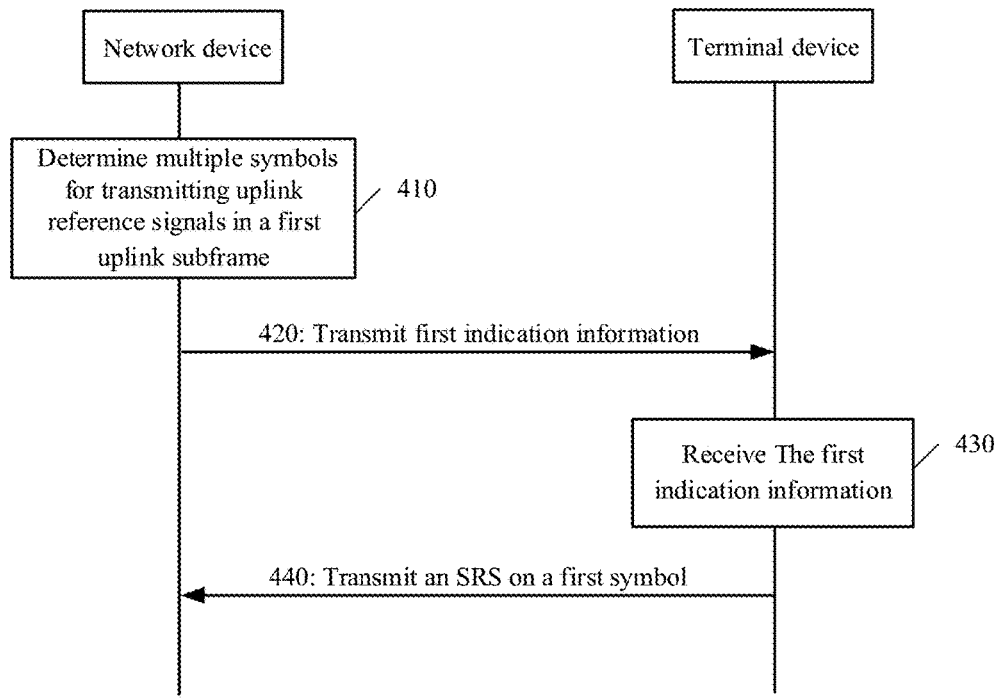
FIG. 4 illustrates an interaction flowchart of a method for transmitting an SRS according to an embodiment of the disclosure.

FIG. 4 illustrates an interaction flowchart of a method for transmitting an SRS according to an embodiment of the disclosure. A first terminal device and a network device are illustrated in FIG. 4. For example, the first terminal device may be any terminal device in the UE 20 to UE 90 illustrated in FIG. 1 and the network device may be the eNodeB 10 illustrated in FIG. 1. As illustrated in FIG. 4, a specific flow of the SRS transmission method includes the following operations.

In 410, the network device determines multiple symbols for transmitting SRSs in a first uplink subframe.

The multiple symbols may be used to transmit SRSs of multiple terminal devices.

Furthermore, each symbol in the multiple symbols may be used to transmit the SRS of a terminal device.

Alternatively, the number of subframes between the first uplink subframe and a first downlink subframe after the first uplink subframe is less than or equal to a predetermined number.

Furthermore, the first uplink subframe is followed by a downlink subframe.

That is, the network device may configure the multiple symbols to transmit the SRSs of the multiple terminal devices in a last uplink subframe, i.e., the first uplink subframe, before an uplink-to-downlink switch-point from an uplink subframe to a downlink subframe. For example, the SRS may be a channel SRS.

In 420, the network device transmits first indication information to the first terminal device.

The first indication information indicates a first symbol for transmitting an SRS of the first terminal device in the first uplink subframe. The first uplink subframe includes the multiple symbols for transmitting the SRSs of the multiple terminal devices. The multiple terminal devices include the first terminal device. The multiple symbols include the first symbol.

In other words, the first indication information is configured to instruct the first terminal device to transmit the SRS on the first symbol in the multiple symbols.

Specifically, the network device may indicate a position of the symbol for transmitting the SRS to the first terminal device, namely indicating the specific symbol on which the first terminal device transmits the SRS in the multiple symbols, through the first indication information.

In fact, the network device transmits the first indication information to each terminal device in the multiple terminal devices. The first indication information indicates the symbol corresponding to each terminal device in the multiple symbols. The first terminal device in the multiple terminal devices corresponds to the first symbol in the multiple symbols. The first symbol is used to transmit the SRS of the first terminal device. In the embodiment of the disclosure, descriptions are made with the network device and the first terminal device as an example.

Alternatively, the first indication information may be born in control signaling.

In 430, the first terminal device receives the first indication information from the network device.

The first indication information indicates the position of the first symbol for transmitting the SRS of the first terminal device in the first uplink subframe. The first uplink subframe includes the multiple symbols for transmitting the SRSs.

In 404, the first terminal device transmits the SRS of the first terminal device to the network device on the first symbol.

Figure 5:
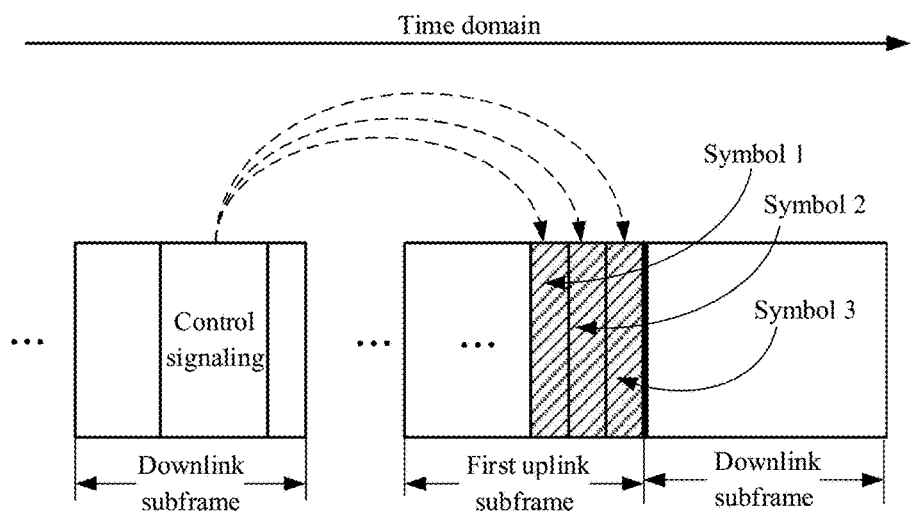
FIG. 5 illustrates a schematic diagram of a method for transmitting an SRS according to an embodiment of the disclosure.

For example, FIG. 5 illustrates a schematic diagram of a method for transmitting an SRS according to an embodiment of the disclosure. The first uplink subframe includes the multiple symbols for transmitting multiple SRSs and the next subframe after the first uplink subframe is a downlink subframe. The network device may transmit downlink control signaling to indicate the specific symbol in the multiple symbols for each terminal device in the multiple terminal devices to transmit the SRS. For example, as illustrated in FIG. 5, the network device indicates the first terminal device to adopt a symbol 1 (i.e., the first symbol) to transmit the SRS, indicates a second terminal device to adopt a symbol 2 to transmit an SRS and indicates a third terminal device to adopt a symbol 3 to transmit an SRS. Since the symbols adopted by the first terminal device, the second terminal device and the third terminal device to transmit the SRSs are all located in the first uplink subframe, reliability of CSI determined by the network device according to the SRSs is high. That is, a channel state determined by the network device according to the SRSs of the three terminal devices is more approximate to a channel state when the three terminal devices transmit downlink data.

It is to be understood that the multiple symbols for transmitting the multiple SRSs in the first uplink subframe may be at any positions of the first uplink subframe. Preferably, the multiple symbols for transmitting the SRSs are distributed at positions close to the uplink-to-downlink switch-point from uplink subframe to downlink subframe. For example, as illustrated in FIG. 5, the first symbol configured for the first terminal device to transmit the SRS, the second symbol configured for the second terminal device to transmit the SRS and the third symbol configured for the third terminal device to transmit the SRS are sequentially distributed at positions adjacent to the uplink-to-downlink switch-point from uplink subframe to downlink subframe.

Therefore, if the SRS is closer to the uplink-to-downlink switch-point from uplink subframe to downlink subframe, the symbol transmitting the SRS is closer to a symbol transmitting downlink data on a time domain, the network device may obtain more accurate CSI by use of channel reciprocity and the channel state acquired by the network device is more approximate to the channel state when the downlink data is transmitted.

In an existing 4G system, only one symbol in a subframe may be used to transmit an SRS and the last uplink subframe, i.e., the first uplink subframe, before the uplink-to-downlink switch-point from uplink subframe to downlink subframe cannot be fully utilized. Therefore, Downlink Control Information (DCI) and a System Information Block (SIB) may only indicate the specific subframe transmitting the SRS and may not specifically indicate the specific symbol transmitting the SRS in the subframe.

In the embodiment of the disclosure, the network device determines the multiple symbols for transmitting the SRSs in the first uplink subframe, so that the channel state determined by the network device according to the SRSs is more approximate to the channel state when the downlink data is transmitted, influence brought by channel aging is reduced in an uplink/downlink channel reciprocity-based transmission process and downlink precoding/beamforming transmission accuracy and efficiency are improved by fully using channel reciprocity.

As another embodiment, a length of the first symbol for transmitting the SRS of the first terminal device is unequal to a length of a second symbol for transmitting downlink data of the first terminal device.

Specifically, in the existing 4G system, a unified symbol length is adopted for a carrier and the same symbol length is adopted for a symbol for transmitting an SRS and a symbol for transmitting downlink data. Different symbol lengths may be adopted for the symbol for transmitting the SRS and the symbol for transmitting the downlink data. An SRS related physical-layer parameter may be independently optimized, for example, a shorter symbol length may be adopted for the SRS, to contain more symbols for transmitting SRSs in a unit time, so that a time-domain allocation granularity of the SRSs is reduced to achieve allocation flexibility of resources for transmitting the SRSs.

Figure 6:
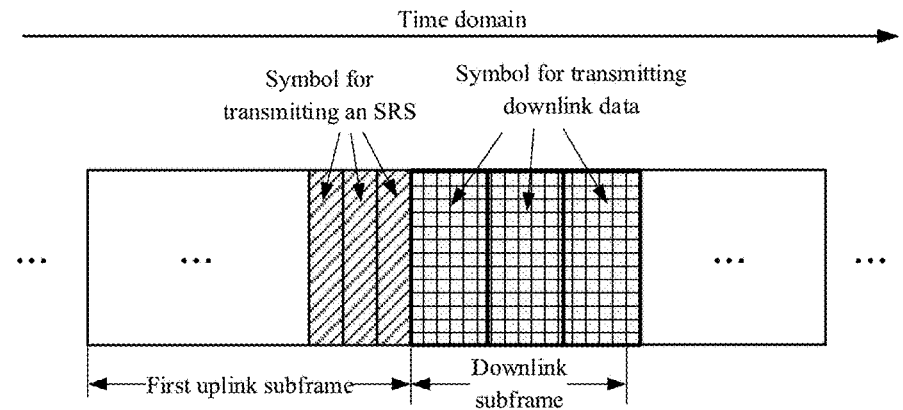
FIG. 6 illustrates a schematic diagram of a symbol for transmitting an SRS and a symbol for transmitting data according to an embodiment of the disclosure.

For example, FIG. 6 illustrates a schematic diagram of a symbol transmitting an SRS and a symbol transmitting downlink data. The length of the first symbol for transmitting the SRS of the first terminal device is different from the length of the second symbol for transmitting the downlink data of the first terminal device. Since the length of the symbol transmitting the SRS is smaller than the length of the symbol transmitting the downlink data, the first uplink subframe may contain more symbols for transmitting SRSs and SRSs of more terminal devices may also be transmitted in the first uplink subframe.

As another embodiment, the SRS transmission method further includes that: the network device determines a frequency-domain resource for transmitting the SRS of the first terminal device. The first indication information transmitted to the first terminal device by the network device in 420 further indicates the frequency-domain resource for transmitting the SRS of the first terminal device.

That is, the network device may dynamically configure a time-domain resource and frequency-domain resource adopted when the terminal transmits the SRS through downlink physical-layer control signaling. A configuration about the time-domain resource includes the symbol configured for the first terminal device to transmit the SRS. A configuration about the frequency-domain resource includes the frequency-domain resource configured for the first terminal device to transmit the SRS, for example, a Resource Block (RB).

Specifically, in the existing 4G system, a base station semi-statically configures a resource transmitting an SRS through Radio Resource Control (RRC) signaling. The base station may activates an aperiodic SRS through an SRS request in a downlink physical-layer control signaling but may only activate the resource for transmitting the SRS according to the RRC signaling, may not directly configure the resource for transmitting the SRS and may not dynamically regulate a frequency-domain resource for transmitting the SRS on a frequency domain, so that many unnecessary resources may be occupied to cause resource waste and SRS transmitting of massive terminal devices in the same frequency band in a 5G massive MIMO technology may not be supported. In the embodiment, the network device may adopt the physical-layer control signaling to dynamically configure the time/frequency-domain resources for transmitting the SRS, and the network device may configure the symbol for transmitting the SRS in the first uplink subframe on the time domain and may control the frequency-domain resource for transmitting the SRS within a certain transmission bandwidth, for example, configuring an RB for transmitting the respective SRS for each terminal device, on the frequency domain. In such a manner, fewest transmission resources may be occupied for transmission of the SRSs and, when the network device acquires the CSI on the basis of channel reciprocity, resources occupied by SRS transmission of the terminal devices may be greatly saved.

As another embodiment, a frequency-domain range configured for transmission of the downlink data of the first terminal device is the same as a frequency-domain range configured for transmission of the SRS of the first terminal device.

Specifically, the network device may simultaneously configure the resource for the first terminal to transmit the SRS and a resource for the terminal to transmit the downlink data through the same downlink physical-layer control signaling. The frequency-domain resource configured for the first terminal device to transmit the SRS and a frequency-domain resource configured for the first terminal device to transmit the downlink data are the same frequency-domain resource. In the existing 4G system, a configuration about the resource for transmitting the SRS and a configuration about the resource for transmitting the downlink data, which are made by the network device, are not associated. While in the embodiment of the disclosure, the resource for transmitting the SRS and the resource for transmitting the downlink data may simultaneously be configured in the same control signaling. For example, a resource indication field is adopted to configure the resource for transmitting the SRS and the resource for transmitting the downlink data. Therefore, an unnecessary signaling overhead may be reduced.

In the embodiment, when the network device acquires the CSI on the basis of channel reciprocity and transmits the downlink data according to the CSI, the resource for transmitting the SRS and the resource for transmitting the downlink data may adopt the same frequency-domain resource. Since a system may realize a frequency selective scheduling function through a periodic SRS, a channel reciprocity SRS may not be required to be transmitted in a wider frequency band.

Figure 7:
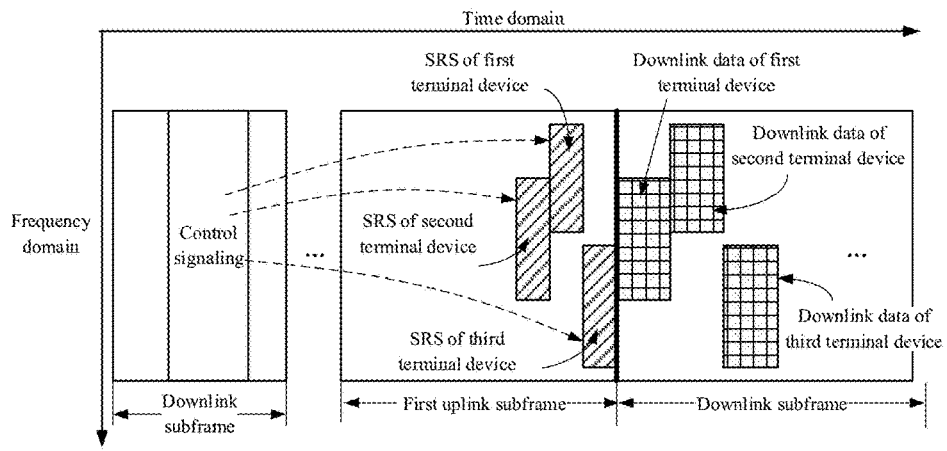
FIG. 7 illustrates a schematic diagram of an SRS resource and a data resource according to an embodiment of the disclosure.

For example, FIG. 7 illustrates a schematic diagram of an SRS resource and a data resource. The control signaling transmitted by the network device in 420 may simultaneously indicate the resource configured for the terminal device to transmit the SRS and the resource receiving the downlink data. A frequency-domain SRS transmission resource and frequency-domain downlink data receiving resource of the same terminal device may be the same. For example, the first terminal device transmits the SRS of the first terminal device on the first symbol and the network device transmits the downlink data of the first terminal device to the first terminal device on the frequency-domain resource adopted by the first terminal device to transmit the SRS. The second terminal device transmits the SRS of the second terminal device on the second symbol and the network device transmits downlink data of the second terminal device to the second terminal device on a frequency-domain resource adopted by the second terminal device to transmit the SRS. The third terminal device transmits the SRS of the third terminal device on the third symbol and the network device transmits downlink data of the third terminal device to the third terminal device on a frequency-domain resource adopted by the third terminal device to transmit the SRS.

As another embodiment, before the operation that the network device transmits control signaling to the first terminal device, namely before 420, the SRS transmission method further includes 450 to 470.

In 450, the first terminal device transmits second indication information to the network device, the second indication information indicating a channel aging speed of the first terminal device.

In 460, the network device receives the second indication information from the first terminal device.

In 470, the network device determines a second symbol for transmitting downlink data of the first terminal device according to the channel aging speed indicated by the second indication information.

In such case, the control signaling transmitted to the terminal device by the network device in 420 optionally further indicates a position of the second symbol configured to receive the downlink data of the first terminal device.

Alternatively, the indication information may include a magnitude of the channel aging speed of the first terminal device or a speed level corresponding to the channel aging speed of the first terminal device.

The speed level may refer to a plurality of speed levels divided by the network device or the terminal device for different channel aging speeds. An aging speed level may also be predetermined by the terminal device and the network device. The terminal device may determine its own corresponding channel aging level according to its own channel aging speed and reports it to the network device through the indication information.

Specifically, each terminal device reports information about its own channel aging speed to the network device and the network device may indicate positions of symbols for transmitting the SRSs of the terminal devices and second symbols for transmitting downlink data of the terminal devices in the multiple symbols for transmitting the SRSs in the first uplink subframe to different terminals according to the channel aging speeds of different terminal devices. For example, the first terminal device may transmit the second indication information indicating the channel aging speed of the first terminal device to the network device through uplink control signaling and the network device configures the resource for transmitting the SRS and the resource for transmitting the downlink data for the first terminal device according to the second indication information reported by the first terminal device.

How to configure, by the network device, a resource for transmitting an SRS and a resource for transmitting downlink data for a terminal device according to indication information indicating a channel aging speed of the terminal device will be described below in combination with the schematic diagram of an SRS resource and a data resource in FIG. 8 with two terminal devices, for example, the first terminal device and the second terminal device, as an example in detail.

As another embodiment, the multiple symbols, determined by the network device in 410, in the first uplink subframe further includes a symbol for transmitting an SRS of a second terminal device. If the channel aging speed of the first terminal device is higher than a channel aging speed of the second terminal device, the first symbol for transmitting the SRS of the first terminal device is located after the symbol for transmitting the SRS of the second terminal device, and the second symbol for transmitting the downlink data of the first terminal device is located before a symbol for transmitting downlink data of the second terminal device.

Specifically, a moment when the terminal device transmits the SRS and a moment when the corresponding downlink data is received are required to be as close as possible. If the channel aging speed of the terminal device is higher, the SRS and the data must get closer to follow channel aging. However, there are limited close symbol resources and downlink data transmission channel resources in the first uplink subframe and the network device, if not mastering the information about the channel aging speed of the terminal device, may not effectively utilize these precious resources to implement optimal resource configuration. In the embodiment, the terminal device transmits the indication information indicating its own channel aging speed to the network device and then the network device may master the terminals with relatively high channel aging speeds and the terminals with relatively low channel aging speeds, thereby preferably scheduling SRS transmission symbol resources and downlink data transmission channel resources most favorable for achievement of channel reciprocity to the terminal devices with relatively high channel aging speeds. For example, the terminal device may assess its own channel aging speed through information about downlink channel measurement, a coordinate change of a Global Positioning System (GPS), an attitude change of the terminal device and the like and report it to the network device.

It is to be understood that the SRS in the embodiment of the disclosure may include a channel SRS and may also include another SRS. There are no limits made herein.

On the basis of the solutions of the embodiment of the disclosure, influence brought by channel aging may be reduced in the uplink/downlink channel reciprocity-based transmission process of the network device and the terminal device.

Figure 9:
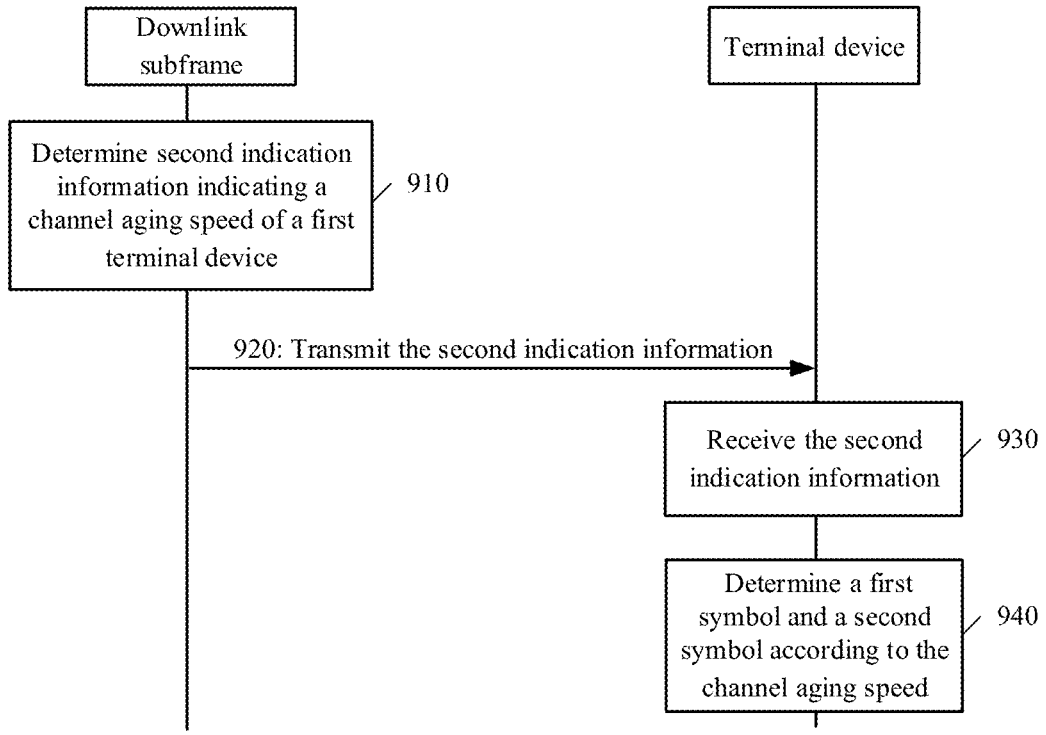
FIG. 9 illustrates an interaction flowchart of a method for transmitting an SRS according to another embodiment of the disclosure.

FIG. 9 illustrates an interaction flowchart of a method for transmitting an SRS according to another embodiment of the disclosure. A first terminal device and a network device are illustrated in FIG. 9. For example, the first terminal device may be any terminal device in the UE 20 to UE 90 illustrated in FIG. 1 and the network device may be the eNodeB 10 illustrated in FIG. 1. As illustrated in FIG. 9, a specific flow of the SRS transmission method includes the following operations.

In 910, the first terminal device determines second indication information, the second indication information indicating a channel aging speed of the first terminal device.

In 920, the first terminal device transmits the second indication information to the network device.

In 930, the network device receives the second indication information from the first terminal device.

The network device may acquire the channel aging speed of the first terminal device according to second indication information, so that a system transmission resource may be reasonably configured according to the channel aging speed to implement scheduling over the terminal device and the like.

Alternatively, the method further includes 940.

In 940, the network device determines a first symbol for transmitting an SRS of the first terminal device and a second symbol for transmitting downlink data of the first terminal device according to the channel aging speed indicated by the second indication information.

Alternatively, the indication information may include a magnitude of the channel aging speed of the first terminal device or a speed level corresponding to the channel aging speed of the first terminal device.

The speed level may refer to a plurality of speed levels divided by the network device or the terminal device for different channel aging speeds. An aging speed level may also be predetermined by the terminal device and the network device. The terminal device may determine its own corresponding channel aging level according to its own channel aging speed and reports it to the network device through the indication information.

Specifically, each terminal device reports information about its own channel aging speed to the network device and the network device may indicate positions of symbols for transmitting SRSs of the terminal devices and second symbols for transmitting downlink data of the terminal devices in multiple symbols for transmitting the SRSs in a first uplink subframe to different terminals according to the channel aging speeds of different terminal devices. For example, the first terminal device may transmit the second indication information indicating the channel aging speed of the first terminal device to the network device through uplink control signaling and the network device configures a resource for transmitting the SRS and a resource for transmitting the downlink data for the first terminal device according to the second indication information reported by the first terminal device.

Since the network device may configure the resource for transmitting the SRS and the resource for transmitting the downlink data for the terminal device according to the channel aging speed of the terminal device, the resources may be reasonably utilized and influence brought by channel aging may be reduced in an uplink/downlink channel reciprocity-based transmission process of the network device and the terminal device.

It is to be understood that, in the embodiment of the disclosure, if multiple symbols are required to be occupied for transmission of the downlink data of the first terminal device, the second symbol, mentioned herein, configured to transmit the downlink data of the first terminal device may refer to a starting symbol in the multiple symbols for transmitting the downlink data of the first terminal device and lengths of the symbols transmitting the downlink data after the starting symbol and a length of the starting symbol are the same and all adopt a data symbol length. The data symbol length may be the same as or different from a length of the first symbol for transmitting the SRS of the first terminal device. If only one symbol is occupied for transmission of the downlink data of the first terminal device, the second symbol is the symbol.

As another embodiment, the channel aging speed of the first terminal device is higher than a channel aging speed of a second terminal device, then the first symbol for transmitting the SRS of the first terminal device is located after a symbol for transmitting an SRS of the second terminal device and the second symbol for transmitting the downlink data of the first terminal device is located before a symbol for transmitting downlink data of the second terminal device.

Specific descriptions about 910 to 940 in the embodiment may refer to descriptions about 450 to 470 and, for simplicity, will not be elaborated herein.

In the embodiment, since the network device may configure the resource for transmitting the SRS and the resource for transmitting the downlink data for the terminal device according to the channel aging speed of the terminal device, the resources may be reasonably utilized and influence brought by channel aging may be reduced in an uplink/downlink channel reciprocity-based transmission process of the network device and the terminal device.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

The data transmission method according to the embodiments of the disclosure is described above in detail. A network device and terminal device according to the embodiments of the disclosure will be described below. It is to be understood that the network device and terminal device of the embodiments of the disclosure may execute various methods in the abovementioned embodiments of the disclosure. That is, the following specific working process of each device may refer to the corresponding process in the method embodiments.

Figure 10:
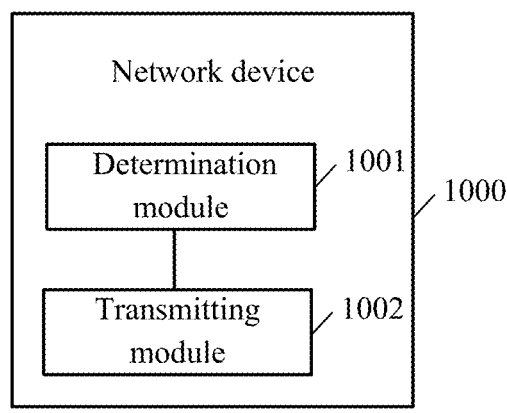
FIG. 10 illustrates a structure block diagram of a network device according to an embodiment of the disclosure.

FIG. 10 illustrates a schematic block diagram of a network device 1000 according to an embodiment of the disclosure. As illustrated in FIG. 10, the network device 1000 includes a determination module 1001 and a transmitting module 1002.

The determination module 1001 is configured to determine multiple symbols for transmitting SRSs in a first uplink subframe.

The transmitting module 1002 is configured to transmit first indication information to each of multiple terminal devices, the first indication information indicating the symbol corresponding to each terminal device in the multiple symbols determined by the determination module, a first terminal device in the multiple terminal devices corresponding to a first symbol in the multiple symbols and the first symbol being configured to transmit an SRS of the first terminal device.

Alternatively, the number of subframes between the first uplink subframe and a first downlink subframe after the first uplink subframe is less than or equal to a predetermined number.

Alternatively, the first uplink subframe is followed by a downlink subframe.

Alternatively, a length of the first symbol for transmitting the SRS of the first terminal device is unequal to a length of a second symbol for transmitting downlink data of the first terminal device.

Alternatively, the determination module 1001 is further configured to:

determine a frequency-domain resource for transmitting the SRS of the first terminal device.

The first indication information transmitted to the first terminal device by the transmitting module 1002 further indicates the frequency-domain resource for transmitting the SRS of the first terminal device.

Alternatively, a frequency-domain range configured for transmission of the downlink data of the first terminal device is the same as a frequency-domain range configured for transmission of the SRS of the first terminal device.

Alternatively, the network device 1000 further includes a receiving module 1003.

The receiving module 1003 is configured to receive second indication information indicating a channel aging speed of the first terminal device from the first terminal device.

Alternatively, the determination module 1001 is further configured to determine the second symbol for transmitting the downlink data of the first terminal device according to the channel aging speed, the first indication information transmitted to the first terminal device by the network device further indicating the second symbol for transmitting the downlink data of the first terminal device.

Alternatively, the multiple symbols further include a symbol for transmitting an SRS of a second terminal device and the channel aging speed of the first terminal device is higher than a channel aging speed of the second terminal device.

The first symbol for transmitting the SRS of the first terminal device is located after the symbol for transmitting the SRS of the second terminal device, and the second symbol for transmitting the downlink data of the first terminal device is located before a symbol for transmitting downlink data of the second terminal device.

Alternatively, the second indication information includes a magnitude of the channel aging speed of the first terminal device or a speed level corresponding to the channel aging speed of the first terminal device.

Since the symbols for transmitting the SRSs of the multiple terminal devices are all located in the first uplink subframe, influence brought by channel aging may be reduced in an uplink/downlink channel reciprocity-based transmission process of the network device and the terminal devices.

It is to be noted that, in the embodiment of the disclosure, the determination module 1001 may be implemented by a processor and the transmitting module 1002 may be implemented by a transceiver. As illustrated in FIG. 10, a network device 1100 may include a processor 1110, a transceiver 1120 and a memory 1130. The transceiver 1120 may include a receiver 1121 and a sender 1122. The memory 1130 may be configured to store a code executed by the processor 1110 and the like. Each component in the network device 1100 is coupled together through a bus system 940. The bus system 1140 includes a data bus, and further includes a power bus, a control bus, a state signal bus and the like.

The processor 1110 is configured to determine multiple symbols for transmitting SRSs in a first uplink subframe.

The transceiver 1120 is configured to transmit first indication information to each of multiple terminal devices, the first indication information indicating the symbol corresponding to each terminal device in the multiple symbols determined by a determination module, a first terminal device in the multiple terminal devices corresponding to a first symbol in the multiple symbols and the first symbol being configured to transmit an SRS of the first terminal device.

Alternatively, the number of subframes between the first uplink subframe and a first downlink subframe after the first uplink subframe is less than or equal to a predetermined number.

Alternatively, the first uplink subframe is followed by a downlink subframe.

Alternatively, a length of the first symbol for transmitting the SRS of the first terminal device is unequal to a length of a second symbol for transmitting downlink data of the first terminal device.

Alternatively, the processor 1110 is further configured to determine a frequency-domain resource for transmitting the SRS of the first terminal device.

The first indication information transmitted to the first terminal device by the transceiver 1120 further indicates the frequency-domain resource for transmitting the SRS of the first terminal device.

Alternatively, a frequency-domain range configured for transmission of the downlink data of the first terminal device is the same as a frequency-domain range configured for transmission of the SRS of the first terminal device.

Alternatively, the transceiver 1120 is further configured to receive second indication information indicating a channel aging speed of the first terminal device from the first terminal device.

The processor 1110 is further configured to determine the second symbol for transmitting the downlink data of the first terminal device according to the channel aging speed.

Alternatively, the multiple symbols further include a symbol for transmitting an SRS of a second terminal device and the channel aging speed of the first terminal device is higher than a channel aging speed of the second terminal device.

The first symbol for transmitting the SRS of the first terminal device is located after the symbol for transmitting the SRS of the second terminal device, and the second symbol for transmitting the downlink data of the first terminal device is located before a symbol for transmitting downlink data of the second terminal device.

Alternatively, the second indication information includes a magnitude of the channel aging speed of the first terminal device or a speed level corresponding to the channel aging speed of the first terminal device.

Figure 12:
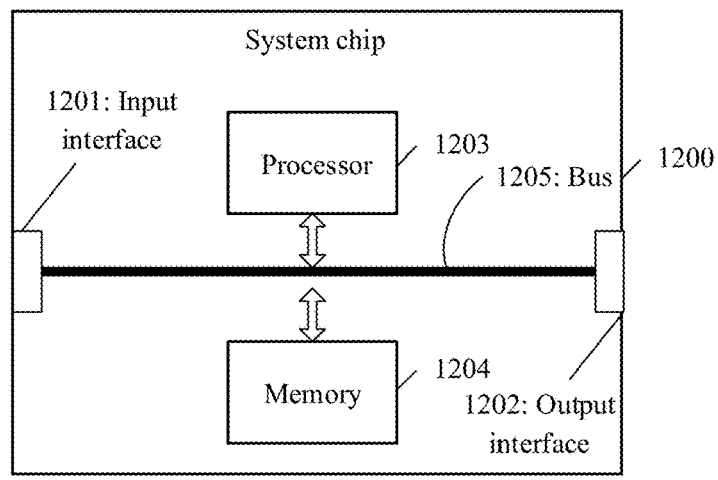
FIG. 12 illustrates a schematic structure diagram of a system chip according to another embodiment of the disclosure.

FIG. 12 illustrates a schematic structure diagram of a system chip according to an embodiment of the disclosure. The system chip 1200 of FIG. 12 includes an input interface 1201, an output interface 1202, at least one processor 1203 and a memory 1204. The input interface 1201, the output interface 1202, the processor 1203 and the memory 1204 are connected through a bus 1205. The processor 1203 is configured to execute a code in the memory 1204. When the code is executed, the processor 1203 implements the method executed by the network device in FIG. 4 to FIG. 8.

Figure 11:
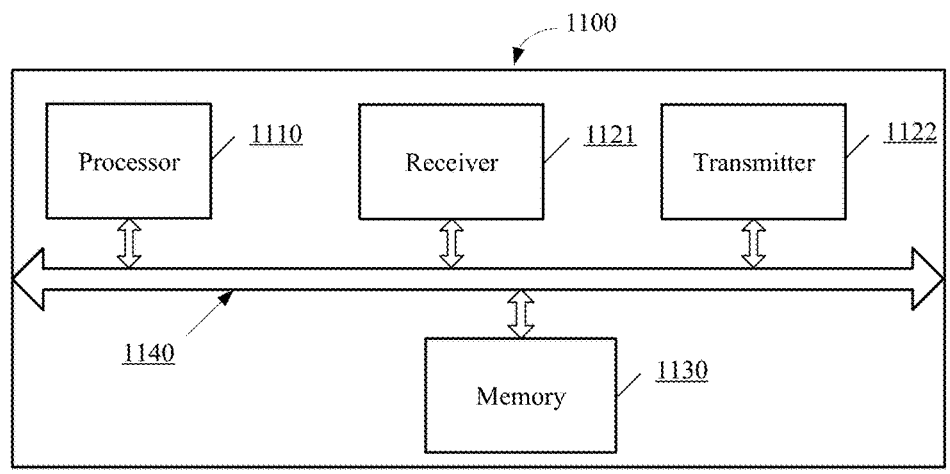
FIG. 11 illustrates a structure block diagram of a network device according to an embodiment of the disclosure.

The network device 1000 illustrated in FIG. 10 or the network device 1100 illustrated in FIG. 11 or the system chip 1200 illustrated in FIG. 12 may implement each process implemented by the network device in the method embodiments of FIG. 4 to FIG. 8. No more elaborations will be made herein to avoid repetitions.

Figure 13:
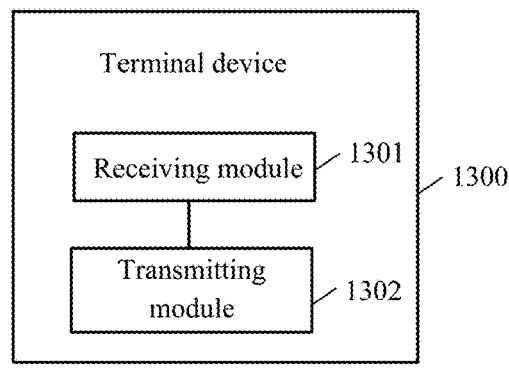
FIG. 13 illustrates a structure block diagram of a terminal device according to an embodiment of the disclosure.

FIG. 13 illustrates a schematic block diagram of a terminal device 1300 according to an embodiment of the disclosure. As illustrated in FIG. 13, the terminal device 1300 includes a receiving module 1301 and a transmitting module 1302.

The receiving module 1301 is configured to receive first indication information from a network device, the first indication information indicating a first symbol for transmitting an SRS of the first terminal device in a first uplink subframe, the first uplink subframe including multiple symbols for transmitting SRSs of multiple terminal devices, the multiple terminal devices including the first terminal device and the multiple symbols including the first symbol.

The transmitting module 1302 is configured to transmit the SRS of the first terminal device to the network device on the first symbol received by the receiving module 1301.

Since the symbols for transmitting the SRSs of the multiple terminal devices are all located in the first uplink subframe, influence brought by channel aging may be reduced in an uplink/downlink channel reciprocity-based transmission process of the network device and the terminal devices.

Alternatively, the number of subframes between the first uplink subframe and a first downlink subframe after the first uplink subframe is less than or equal to a predetermined number.

Alternatively, the first uplink subframe is followed by a downlink subframe.

Alternatively, a length of the first symbol for transmitting the SRS of the first terminal device is unequal to a length of a second symbol for transmitting downlink data of the first terminal device.

Alternatively, the first indication information received from the network device by the first terminal device further indicates a frequency-domain resource for transmitting the SRS of the first terminal device.

Alternatively, a frequency-domain range configured for transmission of the downlink data of the first terminal device is the same as a frequency-domain range configured for transmission of the SRS of the first terminal device.

Alternatively, the transmitting module 1302 is further configured to transmit second indication information indicating a channel aging speed of the first terminal device to the network device, the first indication information received from the network device by the receiving module 1301 further indicating a position of the second symbol for transmitting the downlink data of the first terminal device.

Alternatively, the multiple symbols further include a symbol for transmitting an SRS of a second terminal device, the channel aging speed of the first terminal device is higher than a channel aging speed of the second terminal device, the first symbol for transmitting the SRS of the first terminal device is located after the symbol for transmitting the SRS of the second terminal device, and the second symbol for transmitting the downlink data of the first terminal device is located before a symbol for transmitting downlink data of the second terminal device.

Alternatively, the second indication information includes a magnitude of the channel aging speed of the first terminal device or a speed level corresponding to the channel aging speed of the first terminal device.

Figure 14:
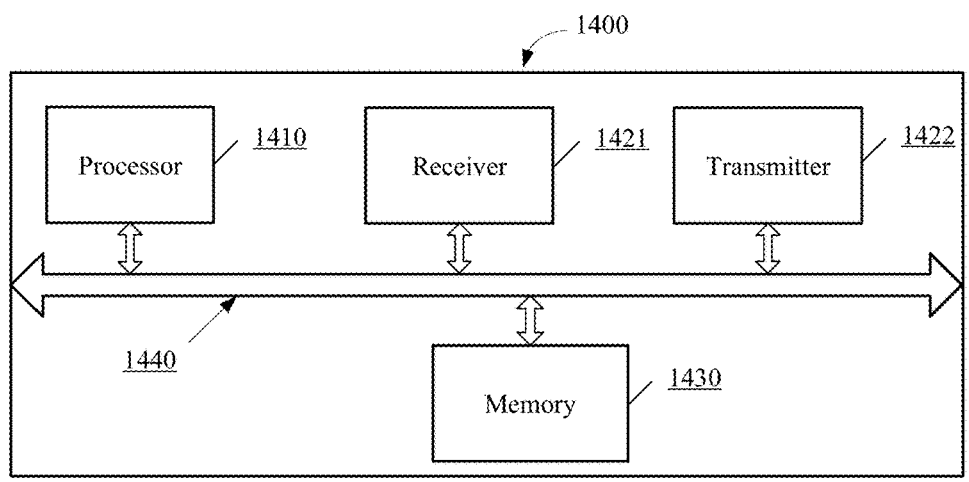
FIG. 14 illustrates a structure block diagram of a terminal device according to an embodiment of the disclosure.

It is to be noted that, in the embodiment of the disclosure, the receiving module 1301 and the transmitting module 1302 may be implemented by a transceiver. As illustrated in FIG. 14, a terminal device 1400 may include a processor 1410, a transceiver 1420 and a memory 1430. The transceiver 1420 may include a receiver 1421 and a sender 1422. The memory 1430 may be configured to store a code executed by the processor 1410 and the like. Each component in the terminal device 1400 is coupled together through a bus system 1440. The bus system 1440 includes a data bus, and further includes a power bus, a control bus, a state signal bus and the like.

The transceiver 1420 is configured to receive first indication information from a network device, the first indication information indicating a first symbol for transmitting an SRS of the first terminal device in a first uplink subframe, the first uplink subframe including multiple symbols for transmitting SRSs of multiple terminal devices, the multiple terminal devices including the first terminal device and the multiple symbols including the first symbol, and transmit the SRS of the first terminal device to the network device on the first symbol received by a receiving module.

Alternatively, the number of subframes between the first uplink subframe and a first downlink subframe after the first uplink subframe is less than or equal to a predetermined number.

Alternatively, the first uplink subframe is followed by a downlink subframe.

Alternatively, a length of the first symbol for transmitting the SRS of the first terminal device is unequal to a length of a second symbol for transmitting downlink data of the first terminal device.

Alternatively, the first indication information received from the network device by the first terminal device further indicates a frequency-domain resource for transmitting the SRS of the first terminal device.

Alternatively, a frequency-domain range configured for transmission of the downlink data of the first terminal device is the same as a frequency-domain, range configured for transmission of the SRS of the first terminal device.

Alternatively, the transceiver 1420 is further configured to transmit second indication information indicating a channel aging speed of the first terminal device to the network device, the first indication information received from the network device by a receiving module 1301 further indicating a position of the second symbol for transmitting the downlink data of the first terminal device.

Alternatively, the multiple symbols further include a symbol for transmitting an SRS of a second terminal device, the channel aging speed of the first terminal device is higher than a channel aging speed of the second terminal device, the first symbol for transmitting the SRS of the first terminal device is located after the symbol for transmitting the SRS of the second terminal device, and the second symbol for transmitting the downlink data of the first terminal device is located before a symbol for transmitting downlink data of the second terminal device.

Alternatively, the second indication information includes a magnitude of the channel aging speed of the first terminal device or a speed level corresponding to the channel aging speed of the first terminal device.

Figure 15:
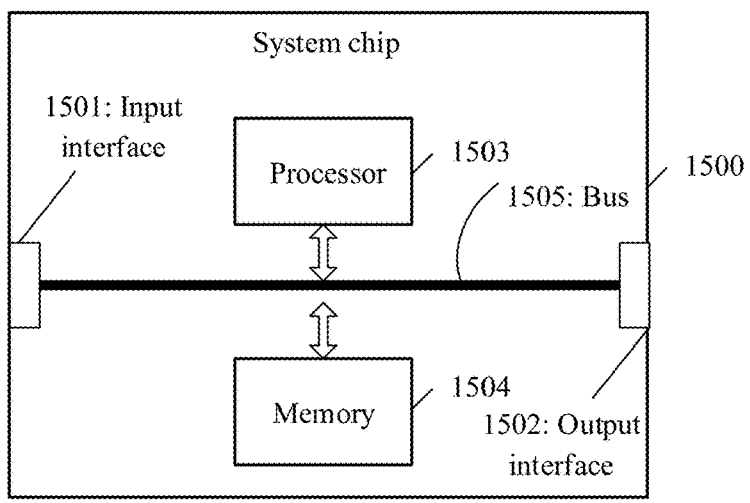
FIG. 15 illustrates a schematic structure diagram of a system chip according to another embodiment of the disclosure.

FIG. 15 illustrates a schematic structure diagram of a system chip according to an embodiment of the disclosure. The system chip 1500 of FIG. 15 includes an input interface 1501, an output interface 1502, at least one processor 1503 and a memory 1504. The input interface 1501, the output interface 1502, the processor 1503 and the memory 1504 are connected through a bus 1505. The processor 1503 is configured to execute a code in the memory 1504. When the code is executed, the processor 1503 implements the method executed by the terminal device in FIG. 4 to FIG. 8.

The terminal device 1300 illustrated in FIG. 13 or the terminal device 1400 illustrated in FIG. 14 or the system chip 1500 illustrated in FIG. 15 may implement each process implemented by the terminal device in the method embodiments of FIG. 4 to FIG. 8. No more elaborations will be made herein to avoid repetitions.

Figure 16:
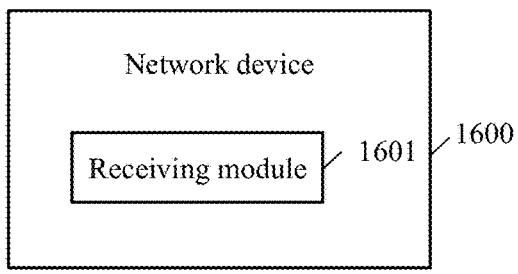
FIG. 16 illustrates a structure block diagram of a network device according to another embodiment of the disclosure.

FIG. 16 illustrates a schematic block diagram of a network device 1600 according to an embodiment of the disclosure. As illustrated in FIG. 16, the network device 1600 includes a receiving module 1601, configured to receive indication information indicating a channel aging speed of a first terminal device from the first terminal device.

Alternatively, the network device 1600 further includes a determination module 1602, configured to determine a first symbol for transmitting an SRS of the first terminal device and a second symbol for transmitting downlink data of the first terminal device according to the channel aging speed.

Alternatively, the channel aging speed of the first terminal device is higher than a channel aging speed of a second terminal device, the first symbol for transmitting the SRS of the first terminal device is located after a symbol for transmitting an SRS of the second terminal device, and the second symbol for transmitting the downlink data of the first terminal device is located before a symbol for transmitting downlink data of the second terminal device.

Alternatively, the indication information includes a magnitude of the channel aging speed of the first terminal device or a speed level corresponding to the channel aging speed of the first terminal device.

Since the network device may configure the resource configured to transmit the SRS and the resource for transmitting the downlink data for the terminal device according to the channel aging speed of the terminal device, the resources may be reasonably utilized and influence brought by channel aging may be reduced in an uplink/downlink channel reciprocity-based transmission process of the network device and the terminal device.

Figure 17:
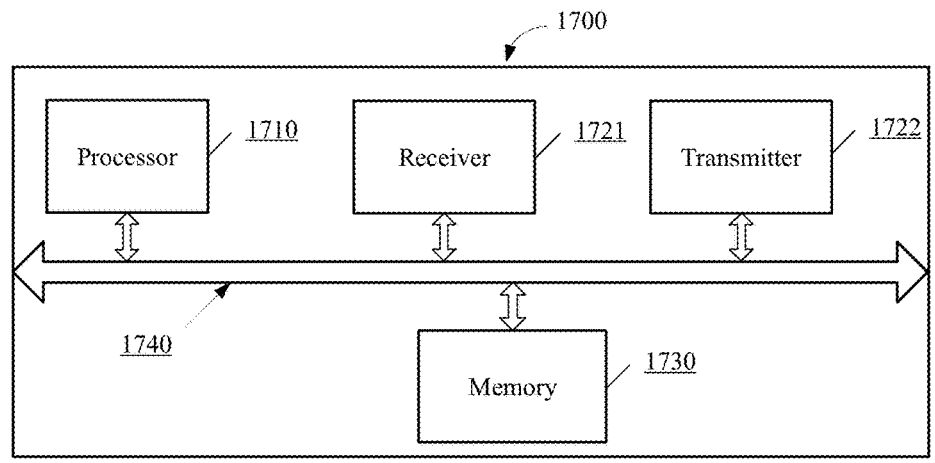
FIG. 17 illustrates a structure block diagram of a network device according to another embodiment of the disclosure.

It is to be noted that, in the embodiment of the disclosure, the receiving module 1701 and the determination module 1702 may be implemented by a transceiver. As illustrated in FIG. 17, a network device 1700 may include a processor 1710, a transceiver 1720 and a memory 1730. The transceiver 1720 may include a receiver 1721 and a sender 1722. The memory 1730 may be configured to store a code executed by the processor 1710 and the like. Each component in the network device 1700 is coupled together through a bus system 1740. The bus system 1740 includes a data bus, and further includes a power bus, a control bus, a state signal bus and the like.

The transceiver 1720 is configured to receive indication information indicating a channel aging speed of a first terminal device from the first terminal device.

Alternatively, the processor 1710 is configured to determine a first symbol for transmitting an SRS of the first terminal device and a second symbol for transmitting downlink data of the first terminal device according to the channel aging speed received by the transceiver 1720.

Alternatively, the channel aging speed of the first terminal device is higher than a channel aging speed of a second terminal device, the first symbol for transmitting the SRS of the first terminal device is located after a symbol for transmitting an SRS of the second terminal device, and the second symbol for transmitting the downlink data of the first terminal device is located before a symbol for transmitting downlink data of the second terminal device.

Alternatively, the indication information includes a magnitude of the channel aging speed of the first terminal device or a speed level corresponding to the channel aging speed of the first terminal device.

Figure 18:
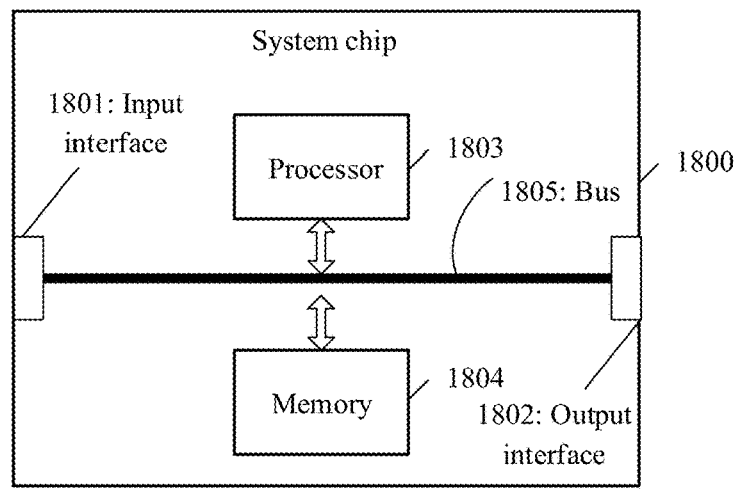
FIG. 18 illustrates a schematic structure diagram of a system chip according to another embodiment of the disclosure.

FIG. 18 illustrates a schematic structure diagram of a system chip according to an embodiment of the disclosure. The system chip 1800 of FIG. 18 includes an input interface 1801, an output interface 1802, at least one processor 1803 and a memory 1804. The input interface 1801, the output interface 1802, the processor 1803 and the memory 1804 are connected through a bus 1805. The processor 1803 is configured to execute a code in the memory 1804. When the code is executed, the processor 1803 implements the method executed by the network device in FIG. 9.

Figure 8:
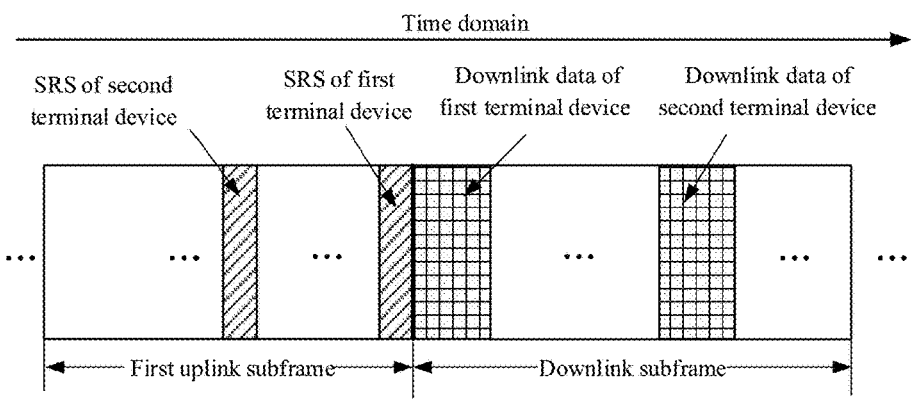
FIG. 8 illustrates a schematic diagram of an SRS resource and a data resource according to an embodiment of the disclosure.

The network device 1600 illustrated in FIG. 16 or the network device 1700 illustrated in FIG. 17 or the system chip 1800 illustrated in FIG. 18 may implement each process implemented by the network device in the method embodiment of FIG. 8. No more elaborations will be made herein to avoid repetitions.

Figure 19:
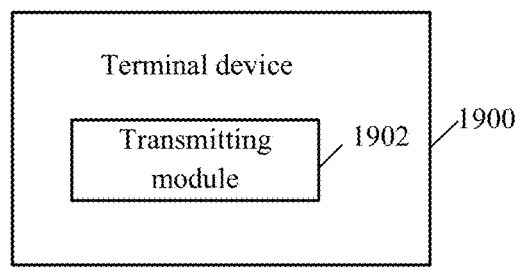
FIG. 19 illustrates a structure block diagram of a terminal device according to another embodiment of the disclosure.

FIG. 19 illustrates a schematic block diagram of a terminal device 1900 according to an embodiment of the disclosure. As illustrated in FIG. 19, the network device 1900 includes a transmitting module 1901, configured to transmit indication information indicating a channel aging speed of a first terminal device to a network device.

Alternatively, the channel aging speed of the first terminal device is higher than a channel aging speed of a second terminal device, a first symbol for transmitting an SRS of the first terminal device is located after a symbol for transmitting an SRS of the second terminal device, and a second symbol for transmitting downlink data of the first terminal device is located before a symbol for transmitting downlink data of the second terminal device.

Alternatively, the indication information includes a magnitude of the channel aging speed of the first terminal device or a speed level corresponding to the channel aging speed of the first terminal device.

Since the terminal reports its own channel aging speed to the network device to enable the network device to configure a resource for transmitting the SRS and a resource for transmitting the downlink data for the terminal device according to the channel aging speed of the terminal device, the resources may be reasonably utilized and influence brought by channel aging may be reduced in an uplink/downlink channel reciprocity-based transmission process of the network device and the terminal device.

Figure 20:
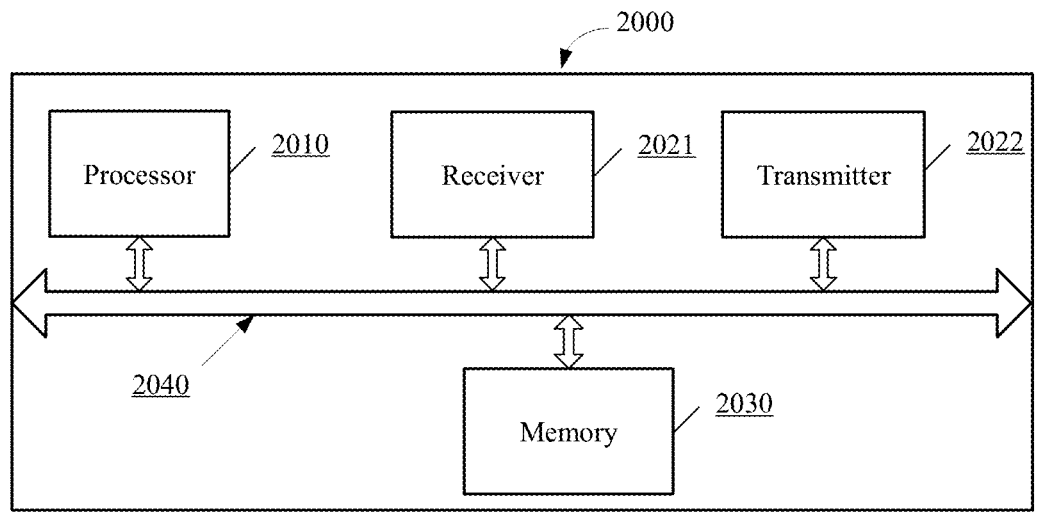
FIG. 20 illustrates a structure block diagram of a terminal device according to another embodiment of the disclosure.

It is to be noted that, in the embodiment of the disclosure, the receiving module 2001 and the transmitting module 2002 may be implemented by a transceiver. As illustrated in FIG. 20, a terminal device 2000 may include a processor 2010, a transceiver 2020 and a memory 2030. The transceiver 2020 may include a receiver 2021 and a sender 2022. The memory 2030 may be configured to store a code executed by the processor 2010 and the like. Each component in the network device 2000 is coupled together through a bus system 2040. The bus system 2040 includes a data bus, and further includes a power bus, a control bus, a state signal bus and the like.

The processor 2010 is configured to determine indication information indicating a channel aging speed of a first terminal device.

Alternatively, the transceiver 2020 is configured to transmit the indication information determined by the processor 2010 to a network device to enable the network device to determine a first symbol for transmitting an SRS of the first terminal device and a second symbol for transmitting downlink data of the first terminal device according to the channel aging speed of the first terminal device.

Alternatively, the channel aging speed of the first terminal device is higher than a channel aging speed of a second terminal device, the first symbol for transmitting the SRS of the first terminal device is located after a symbol for transmitting an SRS of the second terminal device, and the second symbol for transmitting the downlink data of the first terminal device is located before a symbol for transmitting downlink data of the second terminal device.

Alternatively, the indication information includes a magnitude of the channel aging speed of the first terminal device or a speed level corresponding to the channel aging speed of the first terminal device.

Figure 21:
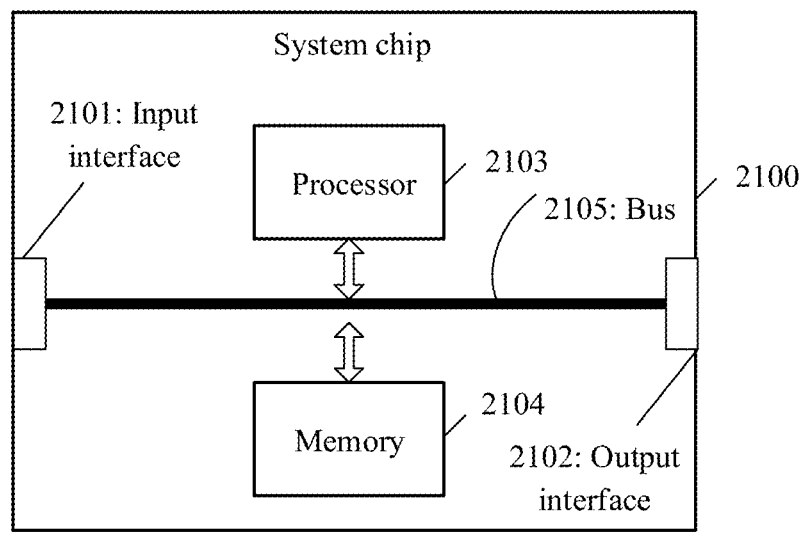
FIG. 21 illustrates a schematic structure diagram of a system chip according to another embodiment of the disclosure.

FIG. 21 illustrates a schematic structure diagram of a system chip according to an embodiment of the disclosure. The system chip 2100 of FIG. 21 includes an input interface 2101, an output interface 2102, at least one processor 2103 and a memory 2104. The input interface 2101, the output interface 2102, the processor 2103 and the memory 2104 are connected through a bus 2105. The processor 2103 is configured to execute a code in the memory 2104. When the code is executed, the processor 2103 implements the method executed by the terminal device in FIG. 9.

The terminal device 1900 illustrated in FIG. 19 or the terminal device 2000 illustrated in FIG. 20 or the system chip 2100 illustrated in FIG. 21 may implement each process implemented by the terminal device in the method embodiment of FIG. 8. No more elaborations will be made herein to avoid repetitions.

It is to be understood that the processor in the embodiment of the disclosure may be an integrated circuit chip and has a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

In addition, terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure.

The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting a channel sounding reference signal (SRS), comprising:
   receiving, by a first terminal device, first indication information from a network device, the first indication information indicating position of a first symbol for transmitting an SRS of the first terminal device; and
   transmitting, by the first terminal device, the SRS of the first terminal device to the network device on the first symbol,
   wherein the first indication information indicates the position of the first symbol for transmitting the SRS of the first terminal device in a first uplink subframe,
   wherein a length of the first symbol for transmitting the SRS of the first terminal device is unequal to a length of a second symbol for transmitting downlink data of the first terminal device.

2. The method of claim 1, wherein the first uplink subframe comprises multiple symbols for transmitting SRSs of multiple terminal devices, the multiple terminal devices comprise the first terminal device, and the multiple symbols comprise the first symbol.

3. The method of claim 1, wherein the first indication information received from the network device by the first terminal device further indicates a frequency-domain resource for transmitting the SRS of the first terminal device.

4. The method of claim 1, wherein a frequency-domain range configured for transmission of the downlink data of the first terminal device is the same as a frequency-domain range configured for transmission of the SRS of the first terminal device.

5. The method of claim 2, further comprising:
   transmitting, by the first terminal device, second indication information indicating a channel aging speed of the first terminal device to the network device,
   wherein the first indication information received from the network device by the first terminal device further indicates the second symbol for transmitting the downlink data of the first terminal device.

6. The method of claim 5, wherein the multiple symbols further comprise a symbol for transmitting an SRS of a second terminal device, the channel aging speed of the first terminal device is higher than a channel aging speed of the second terminal device,
   the first symbol for transmitting the SRS of the first terminal device is arranged after the symbol for transmitting the SRS of the second terminal device, and the second symbol for transmitting the downlink data of the first terminal device is arranged before a symbol for transmitting downlink data of the second terminal device.

7. The method of claim 5, wherein the second indication information comprises a magnitude of the channel aging speed of the first terminal device or a speed level corresponding to the channel aging speed of the first terminal device.

8. A terminal device for transmitting a channel Sounding Reference Signal (SRS), comprising:
   a transceiver;
   a processor; and
   a memory storing instructions, which, when executed by the processor, cause the processor to control the transceiver to:
   receive first indication information from a network device, the first indication information indicating position of a first symbol for transmitting an SRS of the first terminal device; and
   transmit the SRS of the first terminal device to the network device on the first symbol,
   wherein the first indication information indicates the position of the first symbol for transmitting the SRS of the first terminal device in a first uplink subframe,
   wherein a length of the first symbol for transmitting the SRS of the first terminal device is unequal to a length of a second symbol for transmitting downlink data of the first terminal device.

9. The terminal device of claim 8, wherein the first uplink subframe comprises multiple symbols for transmitting SRSs of multiple terminal devices, the multiple terminal devices comprise the first terminal device, and the multiple symbols comprise the first symbol.

10. The terminal device of claim 8, wherein the first indication information received from the network device by the first terminal device further indicates a frequency-domain resource for transmitting the SRS of the first terminal device.

11. The terminal device of claim 8, wherein a frequency-domain resource configured for transmission of downlink data of the first terminal device is as same as the frequency-domain range configured for transmission of the SRS of the first terminal device.

12. The terminal device of claim 9, wherein the instructions, which, when executed by the processor, further cause the processor to control the transceiver to:
   transmit second indication information indicating a channel aging speed of the first terminal device to the network device,
   the first indication information received from the network device further indicating a position of the second symbol for transmitting the downlink data of the first terminal device.

13. The terminal device of claim 12, wherein the multiple symbols further comprise a symbol for transmitting an SRS of a second terminal device, the channel aging speed of the first terminal device is higher than a channel aging speed of the second terminal device,
   the first symbol for transmitting the SRS of the first terminal device is arranged after a symbol for transmitting an SRS of the second terminal device, and the second symbol for transmitting the downlink data of the first terminal device is arranged before a symbol for transmitting downlink data of the second terminal device.

14. The terminal device of claim 12, wherein the second indication information comprises a magnitude of the channel aging speed of the first terminal device or a speed level corresponding to the channel aging speed of the first terminal device.

* * * * *